(12) United States Patent
Jacobson et al.

(10) Patent No.: US 9,407,883 B2
(45) Date of Patent: Aug. 2, 2016

(54) METHOD AND SYSTEM FOR PROCESSING A VIDEO RECORDING WITH SENSOR DATA

(71) Applicant: Vibrado Technologies, Inc., Sunnyvale, CA (US)

(72) Inventors: Quinn A. Jacobson, Sunnyvale, CA (US); Cynthia Kuo, Mountain View, CA (US)

(73) Assignee: Vibrado Technologies, Inc., Sunnyvale, CA (US)

( * ) Notice: Subject to any disclaimer, the term of this patent is extended or adjusted under 35 U.S.C. 154(b) by 0 days.

(21) Appl. No.: 14/602,110

(22) Filed: Jan. 21, 2015

(65) Prior Publication Data

US 2015/0208044 A1 Jul. 23, 2015

Related U.S. Application Data

(60) Provisional application No. 61/929,851, filed on Jan. 21, 2014.

(51) Int. Cl.
| | | |
|---|---|---|
| *H04N 5/76* | (2006.01) | |
| *H04N 7/18* | (2006.01) | |
| *A63B 24/00* | (2006.01) | |
| *H04N 5/77* | (2006.01) | |
| *H04N 9/82* | (2006.01) | |

(52) U.S. Cl.
CPC ............ *H04N 7/188* (2013.01); *A63B 24/0003* (2013.01); *H04N 5/76* (2013.01); *H04N 5/772* (2013.01); *H04N 9/8205* (2013.01); *A63B 2024/0012* (2013.01); *H04N 7/183* (2013.01)

(58) Field of Classification Search
None
See application file for complete search history.

(56) References Cited

U.S. PATENT DOCUMENTS

| 8,285,381 | B2 | 10/2012 | Fahey |
|---|---|---|---|
| 9,014,797 | B2 | 4/2015 | Shiffman et al. |
| 2009/0133499 | A1 | 5/2009 | Cato |
| 2010/0020073 | A1 | 1/2010 | Corazza et al. |
| 2010/0095773 | A1 | 4/2010 | Shaw et al. |
| 2010/0167686 | A1 | 7/2010 | Pan |
| 2010/0262042 | A1 | 10/2010 | Kirn |
| 2010/0268080 | A1 | 10/2010 | Kirn |
| 2011/0196262 | A1 | 8/2011 | McLeod et al. |
| 2011/0221664 | A1 | 9/2011 | Chen et al. |
| 2012/0157886 | A1 | 6/2012 | Tenn et al. |
| 2012/0188158 | A1 | 7/2012 | Tan et al. |
| 2013/0072811 | A1 | 3/2013 | Bartol et al. |
| 2013/0266290 | A1* | 10/2013 | Sathish ............... G11B 27/031 386/278 |

(Continued)

OTHER PUBLICATIONS

U.S. Appl. No. 14/506,322, filed Oct. 3, 2014, Jacobson et al.

(Continued)

*Primary Examiner* — Eileen Adams
(74) *Attorney, Agent, or Firm* — Squirre Patton Boggs (US) LLP

(57) ABSTRACT

A method for processing a video recording involves receiving sensor data from at least one sensor located on a person performing a physical activity. The sensor data includes biometric and/or biomechanical measurements taken from the person while performing the activity. The video recording is of the person performing the activity. The received video recording is correlated with the received sensor data to allow portions of the video recording to be matched with portions of the sensor data from corresponding periods of time. Correlation allows one to readily find and review video footage that show the activity being performed correctly or not based on an interpretation of the sensor data.

20 Claims, 4 Drawing Sheets

(56) References Cited

U.S. PATENT DOCUMENTS

| | | |
|---|---|---|
| 2013/0289434 A1 | 10/2013 | Chou et al. |
| 2014/0150521 A1 | 6/2014 | Jacobson et al. |
| 2014/0163412 A1 | 6/2014 | Jacobson et al. |
| 2015/0100251 A1* | 4/2015 | Solinsky ............ G01C 21/005 702/33 |
| 2015/0375085 A1* | 12/2015 | Molyneux ............ A43B 1/0054 2/22 |

OTHER PUBLICATIONS

U.S. Appl. No. 14/602,100, filed Jan. 21, 2015, Jacobson et al.

* cited by examiner

METHOD AND SYSTEM FOR PROCESSING A VIDEO RECORDING WITH SENSOR DATA

CROSS-REFERENCE TO RELATED APPLICATION

This application claims the benefit of U.S. Provisional Application No. 61/929,851, filed Jan. 21, 2014, which is incorporated herein by reference in its entirety and for all purposes.

FIELD

The invention relates, in general, to video image processing and, more particularly, to correlating a video recording with biometric and/or biomechanical sensor data.

BACKGROUND

A traditional aid for coaching is to make a video recording of an athlete. This lets the coach and athlete review the athlete's form. For example, the athlete's form may include the angle of the arm and hand in preparation for, during, and after making a basketball shot or a baseball pitch. Sometimes a coach may, at a later time, edit a recording to highlight behavior such as identifying the cases of best form and/or cases with the worst form. There are also tools for pausing video and measuring angles of the athlete's limbs and joints in the video. Using video to review an athlete's form can help the athlete better understand his form and identify how to improve. However, identification of segments of the video recording which show good form or bad form must be done by a person, such as a coach or athlete, reviewing the entire video.

What is needed is a method and system that allows segments of the video to be identified as showing good form or bad form. This can allow the user to quickly find those segments of the video which are most helpful.

SUMMARY

Briefly and in general terms, the present invention is directed to a method, system, and computer readable medium for processing a video recording.

In aspects of the present invention, a method comprises receiving sensor data produced during periods of time from at least one sensor located on a person performing a physical activity, receiving a video recording produced during the periods of time in which the sensor data was produced, the video recording showing the person performing the physical activity. The method further comprises correlating the received video recording with the received sensor data to facilitate matching portions of the video recording with portions of the sensor data that were produced during corresponding periods of time.

In aspects of the present invention, a system comprises at least one sensor configured to be attached to a person and configured to produce sensor data over periods of time during which the person is performing a physical activity, a camera configured to produce a video recording showing the person performing the physical activity, and a processing device configured to receive the sensor data and the video recording, and further configured to correlate the received video recording with the received sensor data to facilitate matching portions of the video recording with portions of the sensor data that were produced during corresponding periods of time.

In aspects of the present invention, a non-transitory computer readable medium has a stored computer program embodying instructions, which when executed by a computer, causes the computer to process a video recording. The computer readable medium comprises instructions for receiving sensor data produced during periods of time from at least one sensor located on a person performing a physical activity, instructions for receiving a video recording produced during the periods of time in which the sensor data was produced, the video recording showing the person performing the physical activity, and instructions for correlating the received video recording with the received sensor data to facilitate matching portions of the video recording with portions of the sensor data that were produced during corresponding periods of time.

The features and advantages of the invention will be more readily understood from the following detailed description which should be read in conjunction with the accompanying drawings.

INCORPORATION BY REFERENCE

Figure 1:
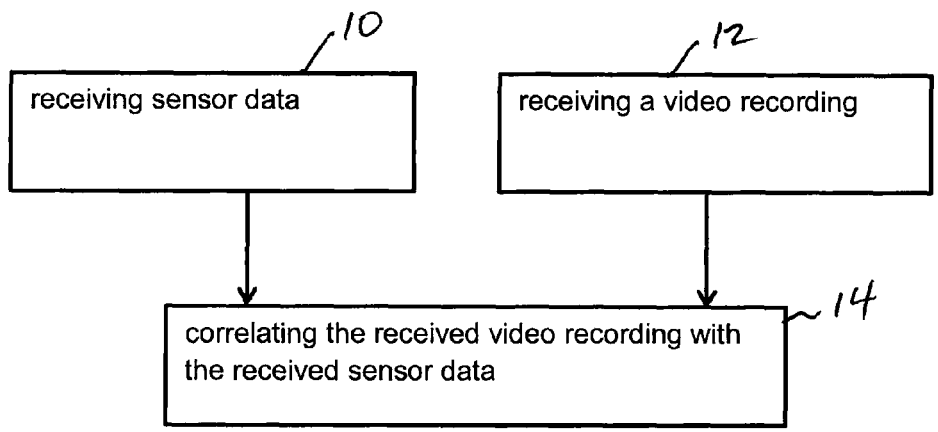
FIG. 1 is a flow diagram showing an exemplary method for processing a video recording.

All publications and patent applications mentioned in the present specification are herein incorporated by reference to the same extent as if each individual publication or patent application was specifically and individually indicated to be incorporated by reference. To the extent there are any inconsistent usages of words and/or phrases between an incorporated publication or patent and the present specification, these words and/or phrases will have a meaning that is consistent with the manner in which they are used in the present specification.

DETAILED DESCRIPTION OF EXEMPLARY EMBODIMENTS

Wearable sensor technology can be used to help athletes analyze their form. Wearable sensors can be integrated into garments to capture the motion of an athlete. The data from the sensors can be analyzed in real-time to provide immediate feedback to athletes. The data can also be reviewed later by the coach and/or athlete to help the athlete understand their form and identify how to improve.

Creating a video recording of an athlete training while wearing a wearable sensor system can be a very powerful combination. If the timing of the video and sensors data can be correlated, there is a range of capabilities that can be enabled.

There are a number of ways to correlate the video recording to the sensor data. This can be done if a modern smart phone or tablet computer is used that is capable of both video recording and connecting wirelessly to the wearable sensors. In this case, a common reference time can be created between the video recording and the sensor data; both are time stamped based on the device's internal clock. Alternatively, a camera that directly connects to the wearable sensors (or that connects to a device connected to the wearable sensors) can enable a time stamping of the video recording and the sensor data to be correlated so that equivalent points can be readily found. In general, any method where a sequence of video can be correlated with a sequence of sensor data without human intervention so that the same point in time can be readily identified in both, within a reasonable margin, can be implemented.

With the correlation of the video recording and wearable sensor data, there are a number of key capabilities that can be enabled. One such capability is to use the sensor data to identify the most representative cases of either or both good and/or bad form. Determining good or bad form is application dependent (e.g., dependent upon the type of activity or situation), but it can be represented by any of set of heuristics that interpret the sensor data. For example, a heuristic for a basketball shot performed with good form may include a predetermined range of angles for each of the upper arm, forearm, and wrist. When sensor data provides angles within the predetermined range, the system will identify the corresponding video segment that is expected to show good form. Various types of wearable sensors can be used to identify good (or desirable) and bad (or undesirable) form. Examples of wearable sensors are described below. Once the representative cases are identified, the corresponding video segments can be automatically identified, and an edited video sequence can be created to highlight them.

Another capability that can be enabled by correlating sensor data with video is the ability to augment the video with additional information. Wearable sensors can capture a range of biometric and biomechanical data. This data may include measurements of heart rate, respiratory rate, joint angles, muscle activity, and/or muscle fatigue. Taking biometric or biomechanical data from the wearable sensors and editing the video to augment the original video recording with the data being added provides a valuable service to help athletes understand their form and how to improve.

Another capability that can be enabled by correlating sensor data with video is the ability to identify the best and worst examples in the video and use that information to help the wearable sensor learn the athlete and automatically tune its heuristics to the athlete. This is important for more advanced athletes where wearable sensors will be used to help improve consistency as opposed to teaching biomechanical form.

Although the discussion above focused on wearable sensors and video to help athletes improve their performance, the same approach can be used to help patients with physical therapy and rehabilitation.

Referring now in more detail to the exemplary drawings for purposes of illustrating exemplary embodiments of the invention, wherein like reference numerals designate corresponding or like elements among the several views, there is shown in FIG. 1 a flow diagram showing an exemplary method for processing a video recording. In block 10, sensor data is received. The sensor data includes biometric and/or biomechanical data produced during periods of time from at least one sensor located on a person performing a physical activity.

Examples of physical activities include without limitation, shooting a basketball into a hoop, pitching a baseball, swinging a golf club, baseball bat, tennis racket, hockey stick, or other type of equipment, and kicking a football. The physical activity does not need to be sporting activity. The physical activity can one performed for physical therapy or rehabilitation. The physical activity can be an exercise designed to help the person recover strength or mobility. The physical activity can be an everyday task, such as walking, running, lifting a spoon or glass toward one's mouth, etc., which the person may have difficulty in performing due to injury, disease, or other condition.

As indicated above, one or more sensors are located on the person. For example, one or more of the sensors can be (1) attached directly onto the person's skin, (2) attached to an article of clothing so that the sensor is in direct contact with skin, and/or (3) attached to an article of clothing so that the sensor is not in direct contact with skin. The type and functional capabilities of the sensor will dictate whether the sensor should in contact with the skin or whether the sensor can be at some distance from the skin.

One or more of the sensors can be located on the person's arm, leg, and/or torso. The location and the total number of sensors will depend upon the type of physical activity that is being evaluated. Positioning of various sensors at different areas of a person's body is described in U.S. Patent Application Publication No. 2014/0163412, which is incorporated herein by reference.

One or more of the sensors can include an inertial measurement unit (IMU) configured to detect motion of the body. The IMU can be the ones described in U.S. Patent Application Publication No. 2014/0150521 (titled "System and Method for Calibrating Inertial Measurement Units), which is hereby incorporated herein by reference. An IMU is configured to provide information on its orientation, velocity, and acceleration. An IMU may include gyroscopes, accelerometers, and/or magnetometers. A gyroscope is configured to measure the rate and direction of rotation. An accelerometer is configured to measure linear acceleration. A magnetometer is configured to detect direction relative to magnetic north pole.

One or more of the sensors can include a myography sensor configured to detect whether a particular muscle is being used by the person and optionally how fatigued that muscle is. Myography sensors include sensors configured to provide signals indicative of muscle contraction, such as signals corresponding to electrical impulses from the muscle, signals corresponding to vibrations from the muscle, and/or signals corresponding to acoustics from the muscle, as described in U.S. Patent Application Publication No. 2014/0163412 (titled "Myography Method and System"), which is hereby incorporated herein by reference. Other exemplary myography sensors include those described in U.S. Patent Application Publication Nos. 2010/0262042 (titled "Acoustic Myography Systems and Methods"), 2010/0268080 (titled "Apparatus and Technique to Inspect Muscle Function"), 2012/0157886 (titled "Mechanomyography Signal Input Device, Human-Machine Operating System and Identification Method Thereof"), 2012/0188158 (titled "Wearable Electromyography-based Human-Computer Interface), 2013/0072811 (titled "Neural Monitoring System"), and 2013/0289434 (titled "Device for Measuring and Analyzing Electromyography Signals"), which are hereby incorporated herein by reference.

Myography sensors include without limitation a receiver device configured to detect energy which has passed through the person's body or reflected from the person's body after having been transmitted by a transmitter device. The receiver device need not be in contact with the person's skin. Myography sensors with these types of receiver and transmitter devices are described in co-pending application Ser. No. 14/506,322 (titled "Myography Method and System"), filed Oct. 3, 2014, which is incorporated herein by reference. The type of energy transmitted by the transmitter device and then received by the receiver device includes without limitation sound energy, electromagnetic energy, or a combination thereof, which are used to infer vibrations occurring on the skin surface, below the skin surface, or in the muscle which naturally arise from muscle contraction. For example, the transmitter device can be configured to transmit (and receiver device can be configured to detect) audio signals, which can include acoustic waves, ultrasonic waves, or both. Acoustic waves are in the range of 20 Hz to 20 kHz and include frequencies audible to humans. Ultrasonic waves have frequencies greater than 20 kHz. Additionally or alternatively, transmitter can be configured to transmit (and receiver 16 can be configured to detect) radio waves. For example, radio waves can have frequencies from 300 GHz to as low as 3 kHz. Additionally or alternatively, the transmitter device can be configured to transmit (and receiver device can be configured to detect) infrared light or other frequencies of light. For example, infrared light can have frequencies in the range of 700 nm to 1 mm. These types of energy, after having passed through the person's body or reflected from the person's body, are analyzed by processor device 32 to infer muscle contraction and/or muscle fatigue.

As indicated above, the sensor data produced by the one or more sensors data includes biometric and/or biomechanical data. Examples of biometric data include without limitation heart rate and respiratory rate. Examples of biomechanical data include without limitation joint angles, muscle activity (e.g., isometric muscle contraction, concentric muscle contraction, and eccentric muscle contraction), muscle fatigue (e.g., inferred from a change in the intensity of muscle contraction, a time domain signature of muscle contraction, and a frequency domain signature of muscle contraction), level of acceleration of a part of the person's body, and/or direction of movement of a part of the person's body.

In FIG. 1, block 12, a video recording is received. The video recording can be received simultaneously with receiving the sensor data. Alternatively, the video recording can be received at a different time from when the sensor data is received. The video recording is produced during the periods of time in which the sensor data was produced. The video recording shows the person performing the physical activity from which the sensor data was taken.

In block 14, the video recording that was received is correlated with the sensor data that was received. This facilitates matching portions of the video recording with portions of the sensor data that were produced during corresponding periods of time. The correlation step can be performed at some period of time after the sensor data and/or the video recording was completely received. Alternatively, the correlation step can be performed while the sensor data and/or the video recording are being received.

Figure 2:
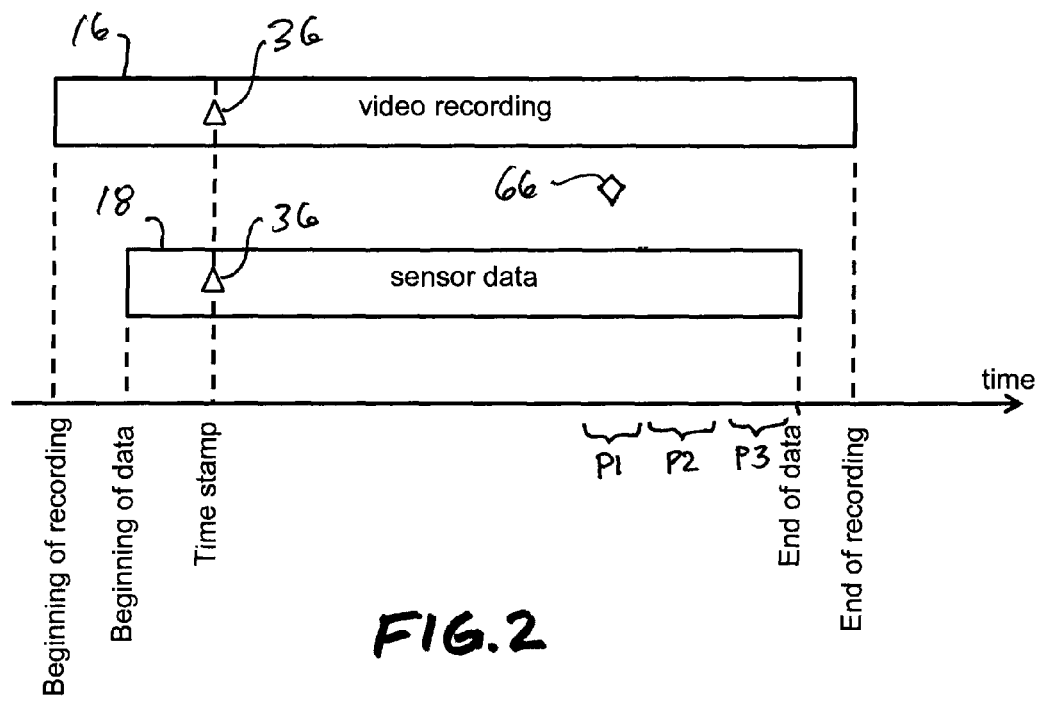
FIG. 2 is a schematic diagram showing a video recording and sensor data produced over time

As shown for example in FIG. 2, a camera may start producing video recording 16 before any of the sensors start producing sensor data 18. Thus, data at the beginning of the sensor data stream would not correspond to video images at the beginning of the video recording. This difference in timing is taken into account by correlating the video recording with the sensor data so that equivalent points (i.e., points corresponding in time) in video recording 16 and sensor data 18 can be readily found. There are a number of ways to correlate video recording 16 to sensor data 18.

Figure 3:
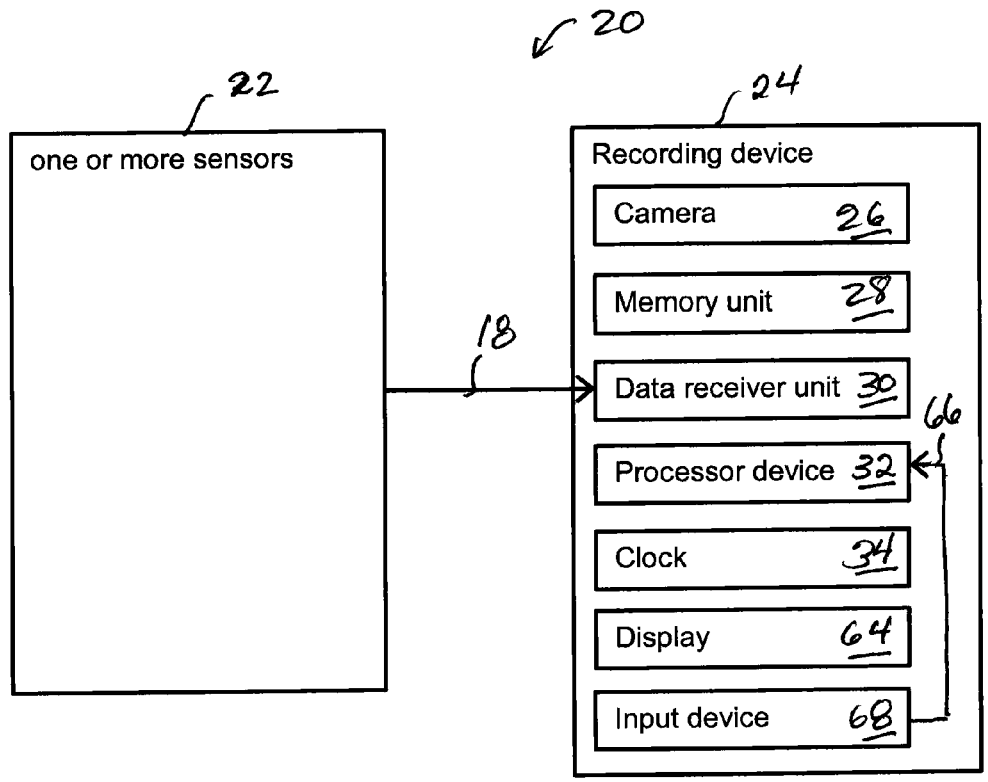
FIG. 3-5 are schematic diagrams showing exemplary systems for processing a video recording, such as the video recording of FIG. 2.

FIG. 3 shows system 20 for processing a video recording. System 20 includes one or more sensors 22 and recording device 24. One or more sensors 22 can be as previously described above or elsewhere herein. For example, all sensors 22 can be myography sensors configured to detect muscle activity (muscle contraction and/or fatigue). Alternatively all sensors 22 can be IMUs or other sensors configured to detect movement of a limb, including acceleration and direction of movement. Alternatively, some sensors 22 can be myography sensors while other sensors 22 are sensors configured to detect movement of a limb, including acceleration and direction of movement.

Although the one or more sensors 22 are illustrated schematically as a single box, it is to be understood that the box can represent any number of sensors which may be located on any number of areas of the person's body. Recording device 24 is a multifunctional device, such as a smart phone, tablet computer, laptop computer, or desktop computer. Recording device 24 includes camera 26 configured to record video images which are stored in memory unit 28. Memory unit 28 can include volatile memory components and/or non-volatile memory components. Memory unit 28 can store data in digital or analog form. Recording device 24 also includes receiver unit 30 configured to receive sensor data 18 from one or more sensors 22. Memory unit 28 may store sensor data 18. Receiver unit 30 can be configured to receive sensor data 18 wirelessly according to any wireless communication standard. The type of wireless communication standard may depend upon the distance between sensors 22 and receiver unit 30. Additionally or alternatively, receiver unit 30 can be configured to receive sensor data 18 through an electrical wire or optical fiber that connects sensors 22 to recording device 24.

In system 20, a common reference time can be created between video recording 16 and sensor data 16. For example, both video recording 16 and sensor data 16 can be time stamped by processor device 32 based on internal clock 34 of recording device 24. Exemplary time stamp 36 is schematically illustrated in FIG. 2. There can be one more time stamps at different times. Processor device 32 can include one or more electronic semiconductor chips and/or signal processing circuitry. Processor device 32 may also include one or more memory devices for volatile and/or non-volatile data storage.

Figure 4:
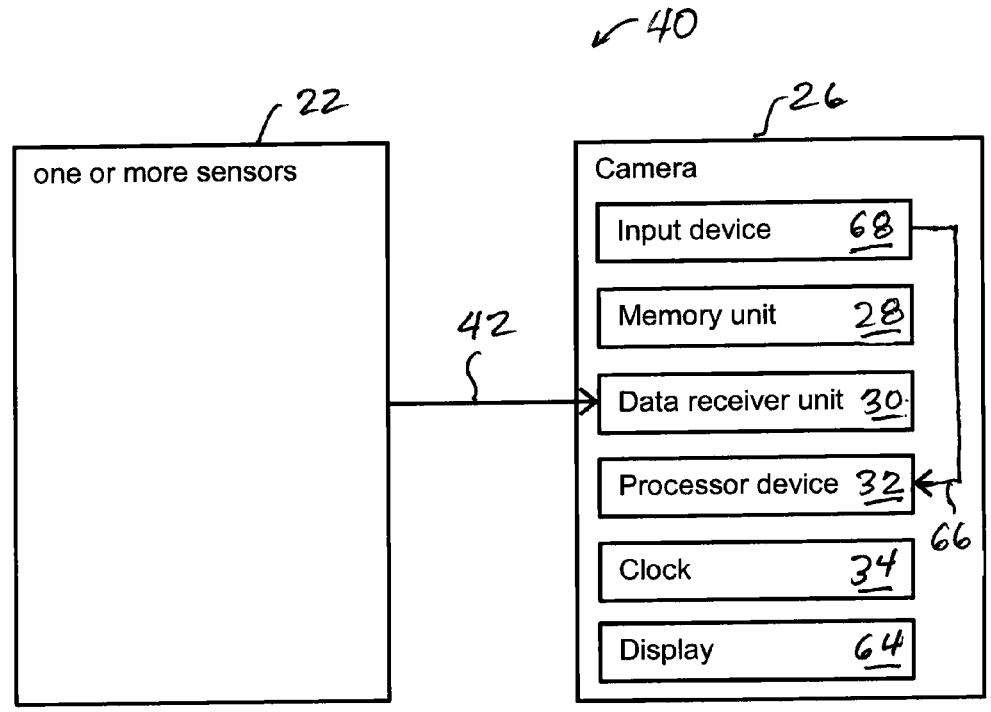

FIG. 4 shows system 40 in which camera 26 communicates directly with one or more sensors 22. Camera 26 is designed mainly for making video recordings, although it has additional functionality that enables it to receive indexing data 42 from one or more sensors 22 while camera 26 produces video recording 16. Optionally, camera 26 can be an infrared camera configured record images based on infrared light. Camera 26 includes receiver unit 30 and processor device 32, which can be as described for FIG. 3. Functionality that enables time stamping is provided by processor device 32. Indexing data 42 can include time stamp 36 which processor device 32 of camera 26 applies to video recording 16 as described for FIG. 2. Memory unit 28 stores video recording 16. Optionally, receiver unit 30 receives sensor data 18 which includes indexing data 42, in which case memory unit 28 may also store sensor data 18.

Figure 5:
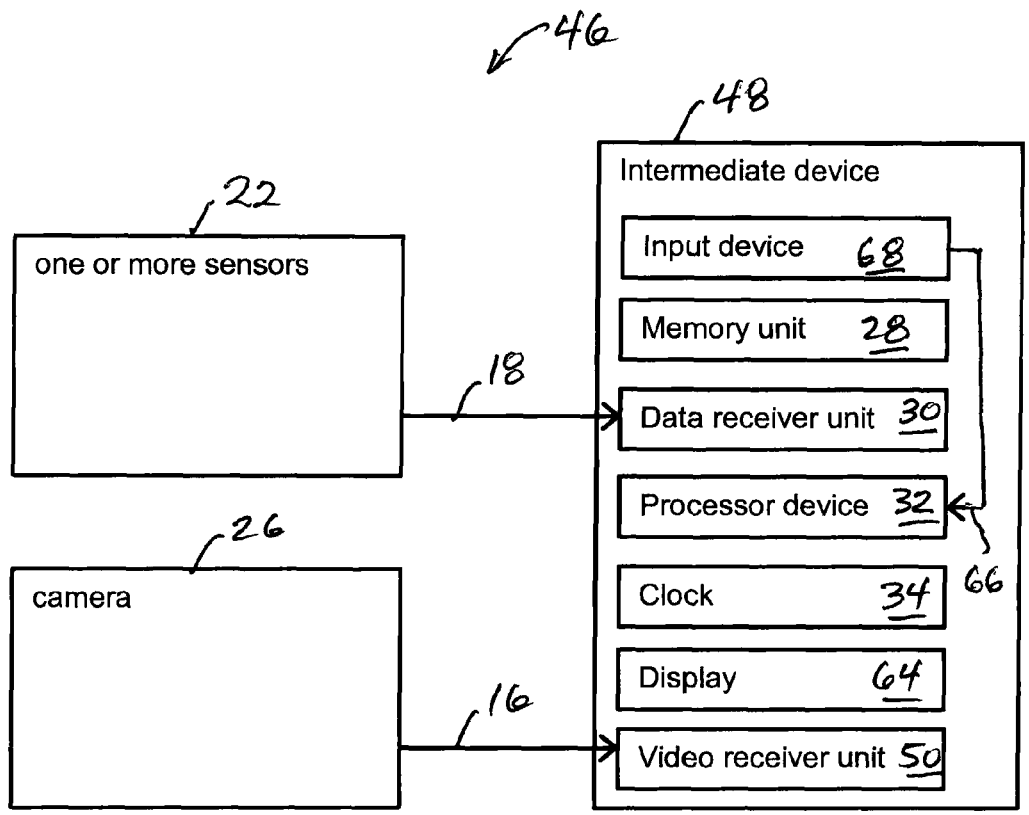

FIG. 5 shows system 46 in which camera 26 communicates with intermediate device 48 that communicates with one or more sensors 22. Intermediate device 48 can be for example and without limitation a desktop computer, laptop computer, tablet computer, or a smart phone. Intermediate device 48 simultaneously receives video recording 16 and sensor data 18. Intermediate device 48 includes video receiver unit 50 that is configured to receive video recording 16 from camera 26 while sensor data 18 is being received by receiver unit 30. Receiver unit 30 within intermediate device 48 can be as described above for FIG. 3.

Intermediate device 48 includes processor device 32 and internal clock 34, which can be as described for FIG. 3. Both video recording 16 and sensor data 16 can be time stamped by processor device 32 based on internal clock 34 of recording device 24. Processor device 32 can apply time stamp 36 to video recording 16 and sensor data 18 as described for FIG. 2.

The exemplary systems of FIGS. 3-5 allow the video recording to be correlated with sensor data such that a portion of video recording 16 can be identified based on a portion of sensor data 18 which has been interpreted as being representative of performance of a physical activity with desirable form. Systems configured in other ways can establish a common reference time that allows the video recording to be correlated with sensor data.

In further aspects, a method for processing video recording 16 includes interpreting a portion of sensor data 18 as being a target data representation of the physical activity. This may include a determination of whether the portion of the sensor data satisfies a criterion for the target data representation. The target data representation can correspond to performance of the physical activity with desirable form. Alternatively, the target data representation can correspond to performance of the physical activity with undesirable form. The method may proceed by identifying a portion of video recording 16 that matches the portion of sensor data 18 that was interpreted as being the target data representation of the physical activity.

Figure 6:
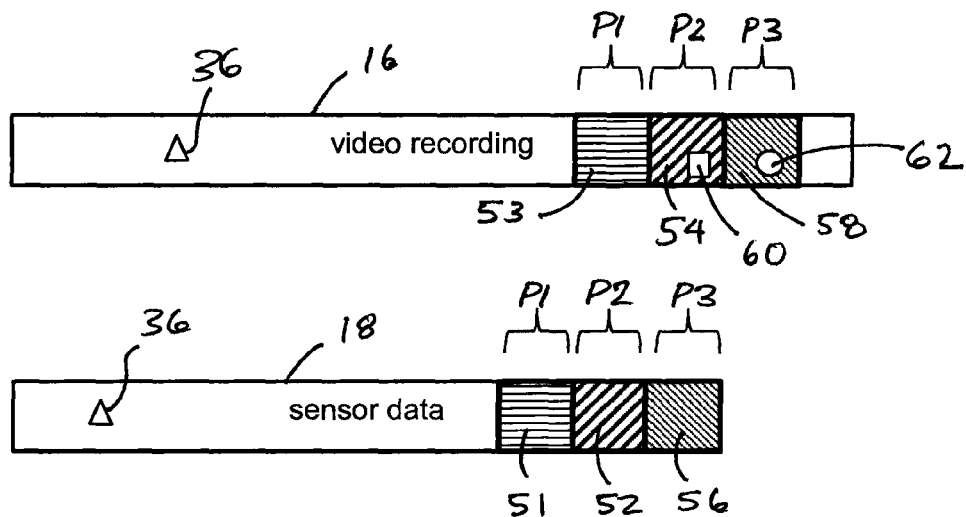
FIG. 6 is a schematic diagram showing portions of the video recording and the sensor data of FIG. 2.

As shown in FIG. 6, video recording 16 is produced over multiple periods of time: P1, P2, and P3. Each period of time has a corresponding portion in video recording 16 and sensor data 18, each of which are schematically depicted by a different type of linear shading line. Portion 52 of sensor data 18 at time period P2 may include biometric and/or biomechanical data which has been determined by processor device 32 to have satisfied a criterion for performing the physical activity with desirable form. The criterion will depend on the type of physical activity which is being evaluated. For example, a criterion can be that the angle of the person's elbow (between the upper arm and the forearm) be from 10 to 20 degrees for the type of physical activity being evaluated, and one or more sensors 24 are arranged on the person to provide measurements of the elbow angle. Portion 52 of the sensor data at time period P2 includes measurements of the elbow angle as being 15 degrees, so processor device 32 interprets portion 52 of the sensor data to be a representation of desirable form. Because video recording 18 has been correlated to sensor data 16, processor device 32 can readily identify portion 54 of video recording 18 from the same period of time P2. Processor device 32 refers to time stamp 36, which provides a common reference time, to match portion 52 and portion 54. This enables a coach, a therapist, the person who performed the activity, or other user to view portion 54 of video recording 16 that is supposed to show desirable form.

In the example above, desirable form was being targeted. The user of the system may wish to target undesirable form. For example, portion 56 (FIG. 6) of sensor data 18 at time period P3 may include biometric and/or biomechanical data which processor device 32 has determined to have satisfied a criterion for performing the physical activity with undesirable form. The criterion will depend on the type of physical activity which is being evaluated. For example, a criterion for undesirable form can be that the angle at the person's shoulder (between the upper arm and the torso) be less than 15 degrees for the type of physical activity being evaluated, and one or more sensors 24 are arranged on the person to provide measurements of the shoulder angle. Portion 56 of the sensor data at time period P3 includes measurements of the shoulder angle as being 5 degrees, so processor device 32 interprets portion 56 of the sensor data to be a representation of undesirable form. Because video recording 18 has been correlated to sensor data 16, processor device 32 can readily identify portion 58 of video recording 18 from the same period of time P3. Processor device 32 refers to time stamp 36, which provides a common reference time, to match portion 56 and portion 58. This enables a coach, therapist, the person who performed the activity, or other user to view portion 58 of video recording 16 which is supposed to show undesirable form.

In the examples above, the criterion includes a range for elbow angle or shoulder angle. The criterion can also include ranges, upper limits, or lower limits for one or more other types of biomechanical data and/or for one or more biometric data. For example, the criterion may include ranges, upper limits, or lower limits for acceleration of a particular limb, direction of motion of the limb, a level of isometric muscle contraction (or other type of contraction), etc.

In further aspects, a method for processing video recording 16 includes modifying video recording 16 or playback of video recording 16 to omit portions of video recording 16 that do not show the targeted form (desirable form or undesirable form) for performing the physical activity. The portions of video recording 16 to be omitted are those which do not match the portion of the sensor data that was interpreted as being the target data representation of the physical activity.

For example, when desirable form is being targeted, processor device 32 can delete portion 58 (FIG. 6) of video recording 16, which shows undesirable form. The result is that the modified video recording will show only desirable form. In another example, portion 58 is not deleted, and when video recording 16 is being played on a display screen, processor device 32 causes portion 58 of the video recording to be skipped over. The result is that only portions of video recording 16 showing desirable form will be seen during playback of the video recording.

Alternatively, when undesirable form is being targeted, processor device 32 can delete portion 54 (FIG. 6) of video recording 16, which shows desirable form. The result is that the modified video recording will show only undesirable form. In another example, portion 54 is not deleted, and when video recording 16 is being played on a display screen, processor device 32 causes portion 54 of the video recording to be skipped over. The result is that only portions of video recording 16 showing undesirable form will be seen during playback of the video recording.

Also a new video recording can be created by processor device 32 in which only portions of video recording 16 showing the targeted form are included.

In further aspects, a method for processing video recording 16 includes modifying video recording 16 to include an indicator at portions of video recording 16 that show the targeted form (desirable form or undesirable form) for performing the physical activity. The portions of video recording 16 that are to include the indicator are the portions of video recording 16 that match portions of sensor data 18 which have been interpreted as being target data representations of the physical activity.

For example, processor device 32 matched portion 54 of video recording 16 to portion 52 of sensor data 16 which was interpreted as being a representation of desirable form, as previously discussed. Next, processor device 32 adds indicator 60 to portion 54 of video recording 16 to bring to attention to a viewing audience that portion 54 shows desirable form in performance of the physical activity. Also, processor device 32 matched portion 58 of video recording 16 to portion 56 of sensor data 16 which was interpreted as being a representation of undesirable form, as previously discussed. Processor device 32 then adds indicator 62 to portion 58 of video recording 16 to bring to attention to the viewing audience that portion 58 shows undesirable form. Indicator 62 can be different from indicator 60 to further differentiate desirable form from undesirable form. Indicators 60 and 62 can be a visual and/or audible indicator. Examples of visual indicators include without limitation various text, symbols, and other modifications to the video image. Examples of audible indicators include without limitation various tones, sound effects, speech, and other modifications to a sound track of video recording 16.

Also a new video recording can be created by processor device 32 which includes one or more portions of video recording 16 are combined with indicators 60 and/or 62.

In further aspects, a method for processing video recording 16 includes interpreting sensor data 18 while sensor data 18 is being produced by one or more sensors 24. For example, processor device 32 can start interpreting portion 51 (FIG. 6) of sensor data 18 at time period P1 before other portions 52 and/or 56 are produced by one or more sensors 24. As a further example, processor device 32 can interpret earlier portions (e.g., portion 51) of sensor data 18 while later portions (e.g., portions 52 and 56) of the sensor data are being produced by one or more sensors 24.

Alternatively, processor device 32 can start interpreting sensor data 18 after all portions have been produced by the sensors. For example, processor device 32 can start interpreting sensor data 18 hours or days after the sensors have completed producing sensor data 18 entirely.

In further aspects, a method for processing video recording 16 includes simultaneously displaying video recording 16 and sensor data 18. Video recording 16 and sensor data 18 are displayed at the same time on the same display screen. For example, processor device 32 can display these items simultaneously on display screen 64 of FIGS. 3-5 or on a display screen external to recording device 24, camera 26 and intermediate device 68. Display screen 64 can be a liquid crystal display screen, light emitting diode display screen, other type of electronic display. An external display screen can be a projector screen fabric, a liquid crystal display screen, light emitting diode display screen, other type of electronic display.

In further aspects, a method for processing video recording 16 includes simultaneously displaying video recording 16, sensor data 18, and an indicator of whether the person is performing the physical activity with targeted form (desirable form or undesirable form). For example, processor device 32 can display all these items at the same time on the same display screen, such as display screen 64 of FIGS. 3-5 or on a display screen external to recording device 24, camera 26 and intermediate device 68. Indicator can be text, graphics, symbols or other indicia that informs a viewing audience that a portion of the video recording currently shows a person performing the physical activity according to the targeted form.

In further aspects, video recording 16 may show the person performing the physical activity repeatedly, and sensor data 16 on the display screen is updated for each repetition of the physical activity. For example, the person can perform the physical activity at time period P2 (FIG. 6) and again at time period P3. Measurements of biometric and/or biomechanical data from portion 52 of the sensor data are displayed simultaneously with portion 54 of video recording 16. As playback of video recording 18 continues, measurements from sensor data portion 52 are replaced by measurements from sensor data portion 56 when video portion 58 is being shown.

In further aspects, a method for processing video recording 16 includes receiving a signal indicating that a portion of video recording 16 is a target visual depiction of the physical activity, followed identifying a portion of sensor data 18 that matches the portion of the video recording for which the signal was received, and then using the portion of the sensor data that was identified, to modify a heuristic for determining whether the person subsequently performs the physical activity with target form.

For example, a coach, therapist, or other user of the system (referred to as an administrator) can view video recording 16 on a display screen. When the administrator sees the physical activity being performed according to the targeted form (desired form or undesired form), the administrator actuates input device 68 (FIGS. 3-5), which sends signal 66 to processor device 32. Input device 68 can be a keyboard, touch sensitive screen, microphone, or a remote control button.

In FIG. 2, the administrator has actuated input device 68 at a portion of video recording 16 for time period P1. As a result, input device 68, generates signal 66 that is received by processor device 32. Processor device 32 refers to time stamp 36 to identify sensor data portion 51 (FIG. 6) that corresponds to the physical activity being performed during time period P1. Processor 32 uses sensor data portion 51 to modify a criterion which would be used later to interpret sensor data. The criterion is referred to as a heuristic in the sense that the criterion is based on historical data, expert opinion, biomechanical calculations, and/or other factors. Historical data can be biometric and/or biomechanical measurements taken from athletes or other persons. Expert opinion on what the heuristic should be can take into account the opinion of experienced coaches, therapists, and other persons. Biomechanical calculations for what the heuristic should be can be based on theoretical models. However, it may be desirable to adjust the heuristic due to natural variations in body size, physical condition, level of experience in performing the physical activity, and/or other factors. Also, athletes and other persons may be more interested in training for consistency and less interested in learning good form. For example, it may be desirable to adjust or customize the heuristic for an athlete who performs a physical activity well but with unconventional form.

If a starting heuristic includes a requirement that elbow angle be from 10 to 20 degrees for a targeted form (desirable form or undesirable form), and 6 degrees was the measurement of elbow angle in data portion 51 at time period P1, then processor device 32 may modify the heuristic to move closer to 6 degrees or enlarge it to include 6 degrees. For example, processor device 32 can modify the heuristic to require elbow angle to be within 6 to 16 degrees, 8 to 18 degrees, or 6 to 20 degrees. The algorithm applied by processor device 32 to modify the heuristic can depend on the type of visual activity being performed, training or therapy objective, experience level of the person performing the activity, physical condition of the person, and/or other factors.

In further aspects, a method for processing video recording 16 includes receiving additional sensor data from at least one sensor 22 while the person is performing the physical activity after the heuristic was modified, and then interpreting the additional sensor data according to the modified heuristic. For example, after the heuristic was modified using sensor data 18 from time period P1, the same physical activity can be performed again in time periods P2 and P3. Processor device 32 will use the modified heuristic to interpret portions 52 and 56 of sensor data 16 produced in time periods P2 and P3.

One or more sensors 22 can be mounted on a garment or other article configured to be worn on the person's body while performing the physical activity. Examples of garments include without limitation shirts, arm sleeves, vests, leggings, girdles, head caps, and gloves. Other articles configured to be worn on the person's body include without limitation braces, bands (e.g., for wrist, arm, leg, chest, or head), face masks, and other protective equipment such as shin guards, pads (e.g., for knee, elbow, or shoulder), etc.

Figure 7:
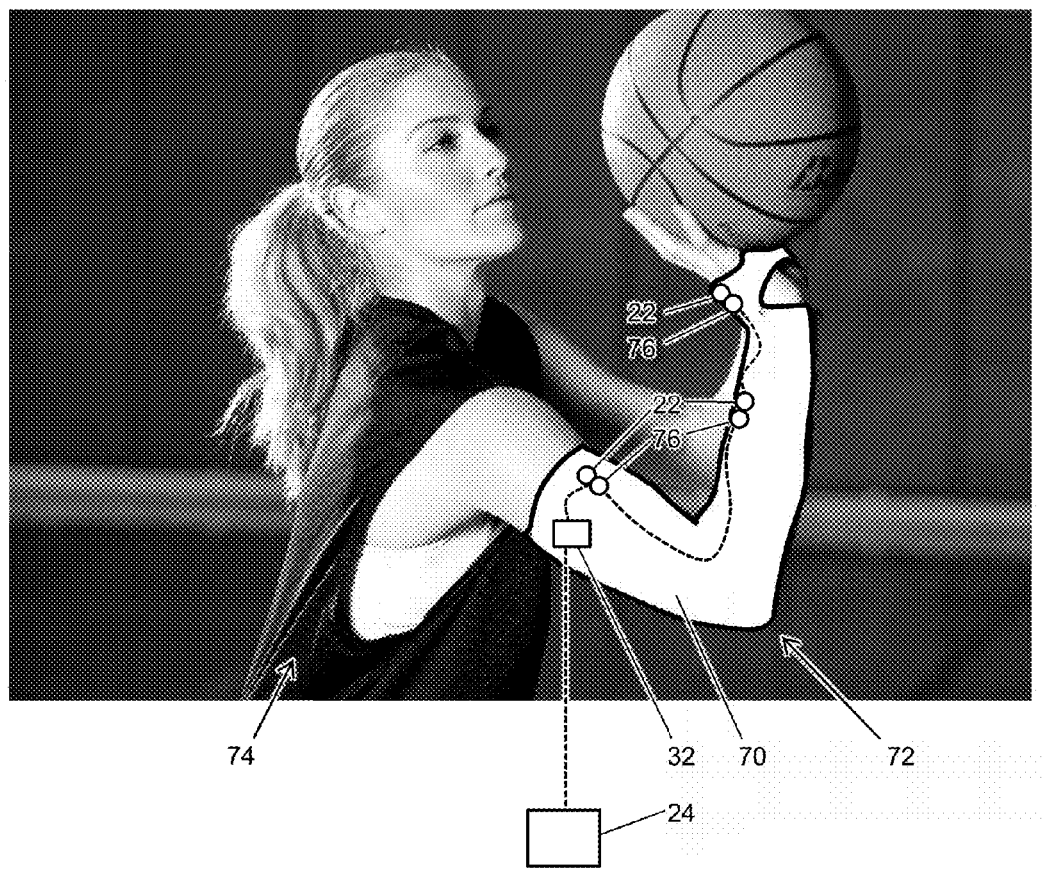
FIG. 7 is a photograph showing a person wearing sensors for producing sensor data, such as the sensor data of FIGS. 2 and 6.

In FIG. 7, one or more sensors 22 are mounted on fabric sleeve 70 which can be worn while playing a sport such as basketball. For example, the sensor/sleeve combination, referred to as training sleeve 72, can provide a basketball player with feedback on jump shots and free throws.

Sensors 22 attached to fabric sleeve 70 detect the primary shooting arm of athlete 74. Sensors 22 enable processor device 32 to detect when athlete 74 makes a shot toward a basketball hoop (as opposed to another maneuver, such as dribbling the ball) and to analyze the form of the shot. Athlete 74 can receive immediate feedback through audio and visual indicators 76 coupled to sensors 22. Indicators 76 can include lights (e.g., light emitting diodes or lamps) and/or speakers or other device configured to generate a sound. When the athlete's form is incorrect or undesirable, indicators 76 emit a light and/or sound to indicate how to improve the shot. Athlete 74 may also track her performance and compare it to that of teammates using a smartphone app.

Training sleeve 72 includes three sensors 22: one on the back of the hand, one on the forearm, and one on the upper arm. Each sensor 22 comprises a 3-axis accelerometer, a 3-axis gyroscope, and a 3-axis compass which, in combination, accurately track rotation and motion in space using algorithms. Sensors 22 are communicatively coupled to processor device 32 which applies the algorithm to sensor data 16. Sensors 22 are sampled by processor device 32 at around 200 times per second. From sensor data 16, processor device 32 can determine the current rotation of the shoulder, elbow, and wrist.

Processor device 32 uses sensor data 16 from sensors 22 to detect when the athlete makes a shot and analyzes the form of the shot. The detection of a shot and the analysis of the shot are performed by algorithms running in processor device 32. The shot is broken down into many measurable parts, generally measurements in time and space. Measurements can include without limitation joint angles, acceleration, and direction of movement. The reference or heuristic for a "good shot" is based on a set of constraints of these measurable parts. The reference or heuristic for a good shot can be configured from the smartphone app to personalize for a particular athlete.

As indicated above, athlete 74 can get immediate feedback through audio and visual indicia from indicators 76. Processor device 32 causes indicators 76 to provide immediate feedback after a shot by either playing a sequence of tones and/or by speaking to the player to provide guidance. Lights of indicators 76 can be lit up to indicate what type of mistake may have been made.

Processor device 32 can communicate to a smartphone or other mobile electronic computing device 24 (such as in FIG. 3) using Bluetooth or other wireless communication protocol. This can allow all sensor data 16 from training sleeve 72 to be uploaded into a cloud storage environment. Further analysis as well as tracking of performance over time can be performed either on the smartphone or in the cloud or both. The smartphone can also be used to personalize settings (such as heuristics) for players, as well as to update the software and algorithms running on processor device 32.

In any aspect herein, including aspects described in connection with any of the figures and methods herein, processor device 32, recording device 24, camera 26, or intermediate device 48 can be capable of executing, in accordance with a computer program stored on a non-transitory computer readable medium, any one or a combination of the steps and functions described above for processing video recording 18. The non-transitory computer readable medium may comprise instructions for performing any one or a combination of the steps and functions described herein, including those described above for processing video recording 18. Processor device 32 and/or memory unit 28 may include the non-transitory computer readable medium. Examples of a non-transitory computer readable medium includes without limitation non-volatile memory such as read only memory (ROM), programmable read only memory, and erasable read only memory; volatile memory such as random access memory; optical storage devices such as compact discs (CDs) and digital versatile discs (DVDs); and magnetic storage devices such as hard disk drives and floppy disk drives.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A method for processing a video recording, the method comprising:
   receiving sensor data produced during periods of time from at least one sensor located on a person performing a physical activity;
   receiving a video recording produced during the periods of time in which the sensor data was produced, the video recording showing the person performing the physical activity;
   correlating the received video recording with the received sensor data to facilitate matching portions of the video recording with portions of the sensor data that were produced during corresponding periods of time;
   interpreting a portion of the sensor data as being a target data representation of the physical activity;
   identifying a portion of the video recording that matches the portion of the sensor data that was interpreted as being the target data representation; and
   modifying either the video recording or playback of the video recording to omit a portion of the video recording that does not match the portion of the sensor data that was interpreted as being the target data representation.

2. The method of claim 1, wherein the at least one sensor includes one or both of: (1) myography sensors configured to detect muscle activity or muscle fatigue, and (2) inertial measurement units configured to detect biomechanical motion.

3. The method of claim 1, wherein the target data representation corresponds to performance of the physical activity with desirable form.

4. The method of claim 1, wherein the target data representation corresponds to performance of the physical activity with undesirable form.

5. The method of claim 1, wherein the interpreting includes determining whether the portion of the sensor data satisfies a criterion for the target data representation.

6. The method of claim 1, wherein the interpreting is performed as the sensor data is produced from the at least one sensor.

7. The method of claim 1, further comprising simultaneously displaying on a display screen the video recording and the sensor data.

8. The method of claim 7, further comprising simultaneously displaying on the display screen the video recording, the sensor data, and an indicator of whether the person is performing the physical activity with desired form.

9. The method of claim 7, wherein the video recording on the display screen shows the person performing the physical activity repeatedly, and the sensor data on the display screen is updated for each repetition of the physical activity.

10. The method of claim 1, further comprising:
receiving a signal indicating that a portion of the video recording is a target visual depiction of the physical activity;
identifying a portion of the sensor data that matches the portion of the video recording for which the signal was received; and
using the portion of the sensor data that was identified, to modify a heuristic for determining whether the person subsequently performs the physical activity with target form.

11. The method of claim 10, wherein the target form is desirable form for performing the physical activity.

12. The method of claim 10, wherein the target form is undesirable form for performing the physical activity.

13. The method of claim 10, further comprising:
receiving additional sensor data from the at least one sensor while the person is performing the physical activity after the modifying of the heuristic; and
interpreting the additional sensor data according to the modified heuristic.

14. A method for processing a video recording, the method comprising:
receiving sensor data produced during periods of time from at least one sensor located on a person performing a physical activity;
receiving a video recording produced during the periods of time in which the sensor data was produced, the video recording showing the person performing the physical activity;
correlating the received video recording with the received sensor data to facilitate matching portions of the video recording with portions of the sensor data that were produced during corresponding periods of time;
interpreting a portion of the sensor data as being a target data representation of the physical activity; and
identifying a portion of the video recording that matches the portion of the sensor data that was interpreted as being the target data representation; and
modifying the video recording to include an indicator at the portion of the video recording that matches the portion of the sensor data that was interpreted as being the target data representation.

15. A system for processing a video recording, the system comprising:
at least one sensor configured to be attached to a person and configured to produce sensor data over periods of time during which the person is performing a physical activity;
a camera configured to produce a video recording showing the person performing the physical activity; and
a processor device configured to receive the sensor data and the video recording, and further configured to correlate the received video recording with the received sensor data to facilitate matching portions of the video recording with portions of the sensor data that were produced during corresponding periods of time,
wherein the processor device is configured to interpret a portion of the sensor data as being a target data representation of the physical activity, the processor is configured to identify a portion of the video recording that matches the portion of the sensor data that was interpreted as being the target data representation, and the processor device is configured to modify either the video recording or playback of the video recording to omit a portion of the video recording that does not match the portion of the sensor data that was interpreted as being the target data representation.

16. The system of claim 15, wherein the at least one sensor includes one or both of: (1) myography sensors configured to detect muscle activity or muscle fatigue, and (2) inertial measurement units configured to detect biomechanical motion.

17. A non-transitory computer readable medium having a stored computer program embodying instructions, which when executed by a computer, causes the computer to process a video recording, the computer readable medium comprising:
instructions for receiving sensor data produced during periods of time from at least one sensor located on a person performing a physical activity;
instructions for receiving a video recording produced during the periods of time in which the sensor data was produced, the video recording showing the person performing the physical activity;
instructions for correlating the received video recording with the received sensor data to facilitate matching portions of the video recording with portions of the sensor data that were produced during corresponding periods of time;
instructions for interpreting a portion of the sensor data as being a target data representation of the physical activity;
instructions for identifying a portion of the video recording that matches the portion of the sensor data that was interpreted as being the target data representation; and
instructions for modifying either the video recording or playback of the video recording to omit a portion of the video recording that does not match the portion of the sensor data that was interpreted as being the target data representation.

18. The non-transitory of claim 17, wherein the at least one sensor includes one or both of: (1) myography sensors configured to detect muscle activity or muscle fatigue, and (2) inertial measurement units configured to detect biomechanical motion.

19. A system for processing a video recording, the system comprising:
at least one sensor configured to be attached to a person and configured to produce sensor data over periods of time during which the person is performing a physical activity;
a camera configured to produce a video recording showing the person performing the physical activity; and
a processor device configured to receive the sensor data and the video recording, and further configured to correlate the received video recording with the received sensor data to facilitate matching portions of the video recording with portions of the sensor data that were produced during corresponding periods of time,
wherein the processor device is configured to interpret a portion of the sensor data as being a target data representation of the physical activity, the processor is configured to identify a portion of the video recording that matches the portion of the sensor data that was interpreted as being the target data representation, and the processor device is configured to modify the video recording to include an indicator at the portion of the video recording that matches the portion of the sensor data that was interpreted as being the target data representation.

20. A non-transitory computer readable medium having a stored computer program embodying instructions, which when executed by a computer, causes the computer to process a video recording, the computer readable medium comprising:

instructions for receiving sensor data produced during periods of time from at least one sensor located on a person performing a physical activity;

instructions for receiving a video recording produced during the periods of time in which the sensor data was produced, the video recording showing the person performing the physical activity;

instructions for correlating the received video recording with the received sensor data to facilitate matching portions of the video recording with portions of the sensor data that were produced during corresponding periods of time;

instructions for interpreting a portion of the sensor data as being a target data representation of the physical activity;

instructions for identifying a portion of the video recording that matches the portion of the sensor data that was interpreted as being the target data representation; and instructions for modifying the video recording to include an indicator at the portion of the video recording that matches the portion of the sensor data that was interpreted as being the target data representation.

* * * * *